US012747720B2

(12) United States Patent
Nakagawa et al.

(10) Patent No.: US 12,747,720 B2
(45) Date of Patent: Sep. 29, 2026

(54) METHOD FOR INSTALLING WIND POWER GENERATOR AND WIND POWER GENERATION SYSTEM

(71) Applicant: TOYOTA JIDOSHA KABUSHIKI KAISHA, Aichi (JP)

(72) Inventors: Takuya Nakagawa, Toki (JP); Shunsuke Suzuki, Nagoya (JP); Masaya Hikita, Kariya (JP); Tsutomu Araki, Okazaki (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 259 days.

(21) Appl. No.: 18/509,309

(22) Filed: Nov. 15, 2023

(65) Prior Publication Data

US 2024/0175425 A1 May 30, 2024

(30) Foreign Application Priority Data

Nov. 29, 2022 (JP) ................................. 2022-190200

(51) Int. Cl.

*F03D 13/10* (2016.01)
*E04H 12/10* (2006.01)
*E04H 12/34* (2006.01)
*F03D 9/43* (2016.01)

(52) U.S. Cl.

CPC ........... *F03D 13/112* (2023.08); *E04H 12/10* (2013.01); *E04H 12/344* (2013.01); *F03D 9/43* (2016.05); *F05B 2240/911* (2013.01); *F05B 2240/9121* (2013.01)

(58) Field of Classification Search

CPC .... F03D 9/43; F03D 13/112; F05B 2240/911; F05B 2230/80; F05B 2240/9121; E04H 12/342; E04H 12/10; E04H 2012/006; E04H 12/344; Y02E 10/72

See application file for complete search history.

(56) References Cited

U.S. PATENT DOCUMENTS

| | | | | |
|---|---|---|---|---|
| 9,379,550 | B2 * | 6/2016 | Peck | E04H 12/10 |
| 10,815,969 | B2 * | 10/2020 | Liu | E02D 27/425 |
| 11,415,106 | B2 * | 8/2022 | Baun | E04H 12/20 |
| 11,725,630 | B2 * | 8/2023 | Lee | F03D 7/04 416/9 |
| 12,467,433 | B2 * | 11/2025 | Nakagawa | F03D 13/203 |
| 2005/0230980 | A1 * | 10/2005 | Brunet | F03D 13/20 290/44 |

(Continued)

FOREIGN PATENT DOCUMENTS

| | | | | |
|---|---|---|---|---|
| DE | 10164514 C1 * | 5/2003 | E04H 12/34 |
| JP | 2003-139042 A | 5/2003 | |

(Continued)

OTHER PUBLICATIONS

English Translation of JP 2011214374 (Year: 2011).*

*Primary Examiner* — Andrew J Triggs
(74) *Attorney, Agent, or Firm* — HAUPTMAN HAM, LLP

(57) ABSTRACT

A method for installing a wind power generator by utilizing an existing structure which includes a foundation and a steel framework structure fixed on the foundation may be provided. The method may include: forming a base by removing at least a part of the framework structure; and fixing a wind power generator to the base.

4 Claims, 9 Drawing Sheets

(56) References Cited

U.S. PATENT DOCUMENTS

| | | | | |
|---|---|---|---|---|
| 2013/0175803 | A1* | 7/2013 | Carson, Jr. | F03D 9/257 290/55 |
| 2016/0215762 | A1* | 7/2016 | Rohden | E04C 5/162 |
| 2019/0071862 | A1 | 3/2019 | White | |
| 2020/0088168 | A1* | 3/2020 | Baun | F03D 9/43 |
| 2024/0035249 | A1* | 2/2024 | Montaner Fraguet | E02D 37/00 |
| 2024/0175425 | A1* | 5/2024 | Nakagawa | E04H 12/10 |

FOREIGN PATENT DOCUMENTS

| | | | | |
|---|---|---|---|---|
| JP | 2004346651 | A | * | 12/2004 |
| JP | 2011132859 | A | | 7/2011 |
| JP | 2011214374 | A | * | 10/2011 |
| JP | 5350888 | B2 | * | 11/2013 |
| JP | 2019513920 | A | | 5/2019 |
| JP | 2020125752 | A | * | 8/2020 |
| KR | 1020120104012 | A | | 9/2012 |
| WO | 2022029355 | A1 | | 2/2022 |

* cited by examiner

METHOD FOR INSTALLING WIND POWER GENERATOR AND WIND POWER GENERATION SYSTEM

REFERENCE TO RELATED APPLICATIONS

This application claims priority from Japanese Patent Application No. 2022-190200 filed on Nov. 29, 2022. The entire content of the priority application is incorporated herein by reference.

BACKGROUND ART

The art disclosed herein relates to a method of installing a wind power generator and a wind power generation system.

There may be cases where a wind power generator is installed near an existing structure such as a steel tower that supports overhead transmission lines. An art related to the cases is described in Japanese Patent Application Publication No. 2003-139042.

DESCRIPTION

A base is required to install a wind power generator. However, in the case of newly building the base, time and man-hours had been required, for example, new concrete placing is required.

A method of installing a wind power generator disclosed herein is a method of installing a wind power generator by utilizing an existing structure. The structure comprises a foundation and a steel framework structure fixed on the foundation. The method may comprise forming a base by removing at least a part of the framework structure. The method may comprise fixing the wind power generator to the base.

The existing structure may be of various types. For example, a steel tower that supports an overhead power transmission line or a structure that supports various types of heavy equipment for newly building a new structure may suffice. In the above-described configuration, an existing structure can be utilized to form a base for fixing the wind power generator. Since there is no need to newly build a base, it is possible to reduce the time and man-hours for installing the wind power generator. It is possible to reduce the installation cost of the wind power generator.

Figure 1:
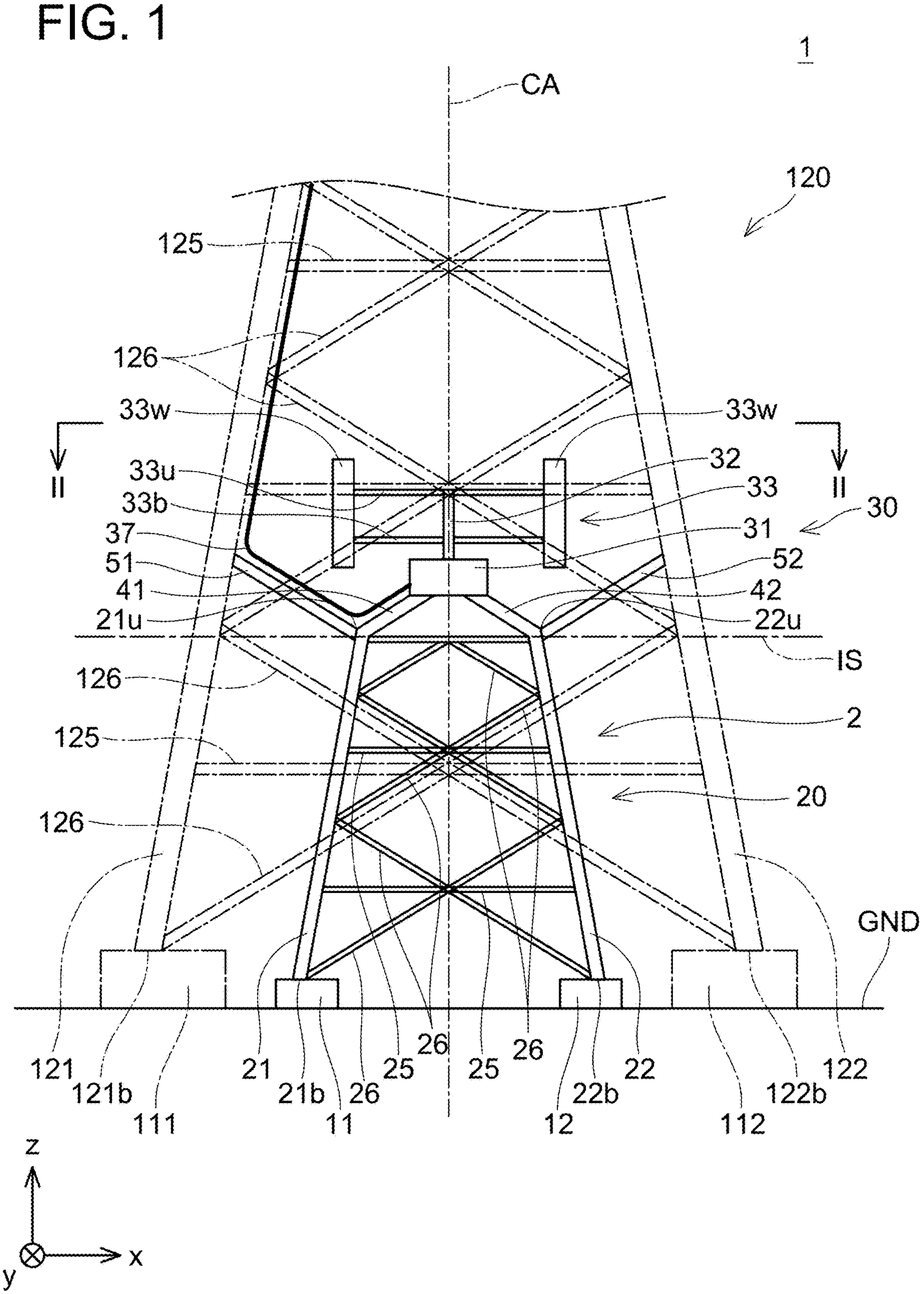
FIG. 1 schematically illustrates a configuration diagram of a wind power generator 1.

The framework structure may be a first steel tower that supports an overhead power line. The method may further comprise constructing a second steel tower such that the second steel tower wraps around the first steel tower, wherein the constructing of the second steel tower is performed before the forming of the base. The method may further comprise moving the overhead power line from the first steel tower to the second steel tower, wherein the moving of the overhead power line is performed after the constructing of the second steel tower. The forming of the base may be performed after the moving of the overhead power line.

According to the above-described configuration, the base can be formed inside the newly built second steel tower. The site of the second steel tower can be effectively utilized.

The forming of the base may comprise: removing a part of the first steel tower such that the base includes a lower part of the first steel tower fixed to the foundation. The forming of the base may comprise connecting the lower part of the first steel tower included in the base to the second steel tower using a connecting member.

According to the above-described configuration, a height of the base can be made higher than that of the foundation. Since the wind power generator can be installed at a high place where a wind speed is higher than the ground, power generation efficiency can be increased.

The framework structure may be a crane tower having an upper part to which a crane is fixed. The method may further comprise constructing a third steel tower by using the crane, wherein the constructing of the third steel tower is performed before the forming of the base. The forming of the base may include: removing the crane; and removing at least a part of the crane tower.

According to the above configuration, the crane tower that was used for the construction of the third steel tower can be utilized to form the base. Since there is no need to newly build a base, it is possible to reduce the time and man-hours for installing the wind power generator.

A wind power generation system disclosed herein may comprise a first steel tower supporting an overhead power line. The wind generation system may comprise a second steel tower that is located inside or in proximity to the first steel tower and that does not support the overhead power line. The wind generation system may comprise a wind power generator arranged at an upper part of the second steel tower. The second steel tower may have a structure having an upper framework structure with a part of the upper framework structure removed.

According to the above-described configuration, the second steel tower that does not support an overhead power transmission line can be used to form a base for fixing the wind power generator. Since there is no need to newly build a base, it is possible to reduce the installation cost of the wind power generator.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the disclosure. Furthermore, each of the additional features and teachings disclosed below may be utilized separately or in conjunction with other features and teachings to provide improved method for installing a wind power generator and wind power generation system.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

First Embodiment

Configuration of Wind Power Generation System 1

Figure 2:
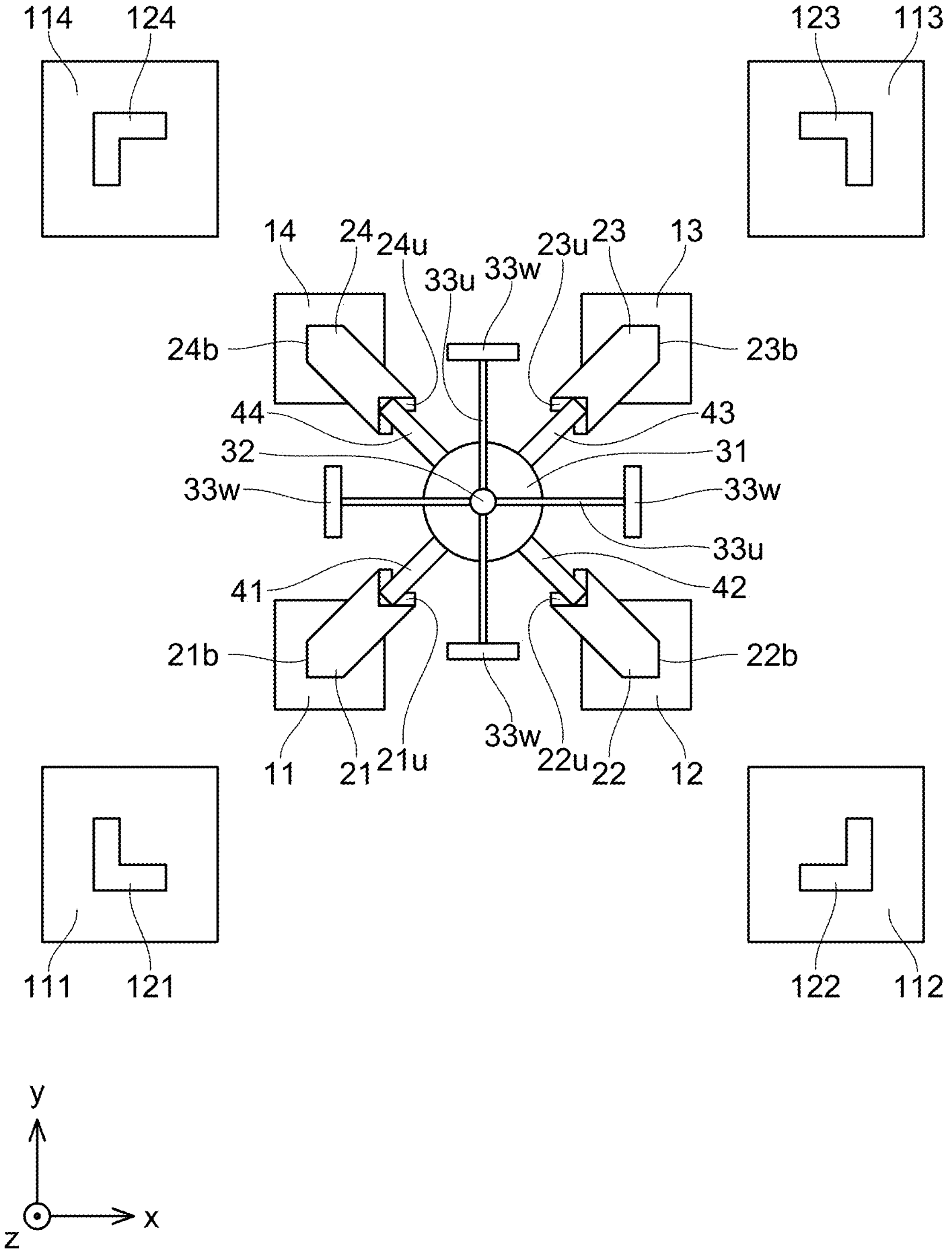
FIG. 2 schematically illustrates a top view taken from a II-II section of FIG. 1.

FIG. 1 schematically illustrates a side view of a wind power generation system 1. FIG. 2 schematically illustrates a top view taken from a II-II section of FIG. 1. In FIG. 2, only main components are shown for sake of clarity. The wind power generation system 1 mainly comprises a base 2, a wind power generator 30, and a second steel tower 120.

The second steel tower 120 is a structure for arranging an overhead power transmission line (not shown). The second steel tower 120 has a structure in which equal angle steel bars or steel pipes are joined by bolts or the like. In FIG. 1, the second steel tower 120 is shown in imaginary lines for the sake of clarity. The second steel tower 120 includes foundations 111 to 114, main column members 121 to 124, a plurality of horizontal members 125, and a plurality of diagonal members 126.

The foundations 111-114 are fixed to a ground GND. The foundations 111 to 114 are structural members for supporting the second steel tower 120. A type of the foundations 111 to 114 is not particularly limited, and may be, for example, a concrete foundation or a steel foundation. As shown in FIG. 2, the foundations 111-114 are arranged at four corners of a quadrilateral. Base ends 121*b*-124*b* of the main column members 121-124 are respectively secured to the foundations 111-114. The main column members 121-124 extend upward (+z direction) from the foundations 111-114. Each of distances between the main column members 121-124 decreases as the main column members 121-124 are at a higher spot in the second steel tower 120. Thus, the second steel tower 120 has a substantially quadrangular pyramid shape and has a central axis CA. The horizontal members 125 and the diagonal members 126 are members that reinforce the main column members 121 to 124 by connecting the main column members 121 to 124 to each other. A truss structure is formed by the horizontal members 125 and the diagonal members 126.

The base 2 and the wind power generator 30 are located inside the second steel tower 120. As will be described later, the base 2 is a structure formed by removing a part of the existing first steel tower 2A. The base 2 comprises foundations 11-14, a framework structure 20, and connecting members 51-54. The framework structure 20 is constituted of steel and is fixed on the foundations 11-14. The foundations 11-14 are fixed to the ground GND. The foundations 11-14 are structural members for supporting the framework structure 20. As shown in FIG. 2, the foundations 11-14 are arranged at four corners of a quadrilateral.

The framework structure 20 is a structure for installing the wind power generator 30. The framework structure 20 has a structure in which equal angle steel bars or steel pipes are joined by bolts or the like. The framework structure 20 includes main column members 21-24, a plurality of horizontal members 25, and a plurality of diagonal members 26. Base ends 21*b*-24*b* of the main column members 21-24 are fixed to the foundations 11-14. The main column members 21-24 extend upward (+z direction) from the foundations 11-14. Each of distances between the main column members 21-24 decreases as the main column members 21-24 are at a higher spot in the framework structure 20. An installation surface IS perpendicular to the central axis CA is formed by upper ends 21*u*-24*u* of the main column members 21-24. The installation surface IS is a surface on which the wind power generator 30 is installed. Thus, the framework structure 20 has a shape of a truncated quadrangular pyramid. The horizontal members 25 and the diagonal members 26 are members that reinforce the main column members 21-24 by connecting the main column members 21-24 to each other. A truss structure is formed by the horizontal members 25 and the diagonal members 26.

Each of the connecting members 51-54 extends from its respective upper end 21*u*-24*u* toward a corresponding one of the main column members 121-124 while they are also displaced upward. A lower end of the connecting member 51 is fixed to the upper end 21*u* of the main column member 21. An upper end of the connecting member 51 is fixed to the main column member 121. Similarly, a lower end of the connecting member 52 is fixed to the upper end 22*u* of the main column member 22. An upper end of the connecting member 51 is fixed to the main column member 122. Since the connecting members 53 and 54 have the same structure, illustration and description thereof will be omitted.

The wind power generator 30 is located above the framework structure 20. The wind power generator 30 includes a vertical axis wind turbine. The structure of the vertical axis wind turbine may be of various types, and may be, for example, gyromill type, Darius type, Savonius type, etc. The wind power generator 30 comprises a generator 31, a rotating main shaft 32, a wind turbine 33, and leg members 41 to 44. The rotating main shaft 32 extends upward from the generator 31. The wind turbine 33 includes a plurality of rotor blades 33*w*, a plurality of lower arms 33*b*, and a plurality of upper arms 33*u*. The plurality of rotor blades 33*w* is arranged in a cylindrical shape around the rotating main shaft 32. The plurality of lower arms 33*b* connects lower portions of the plurality of rotor blades 33*w* and the rotating main shaft 32. The plurality of upper arms 33*u* connects upper portions of the plurality of rotor blades 33*w* and the rotating main shaft 32.

Each of the leg members 41-44 extends from the generator 31 toward a corresponding one of the main column members 21-24 while they are also displaced downward. A lower end of the leg member 41 is fixed to the upper end 21*u* of the main column member 21. An upper end of the leg member 41 is fixed to the generator 31. Similarly, a lower end of the leg member 42 is fixed to the upper end 22*u* of the main column member 22. An upper end of the leg member 42 is fixed to the generator 31. Since the leg members 43 and 44 have the same structure, illustration and description thereof will be omitted.

A power transmission line 37 connects the generator 31 and an overhead power transmission line (not shown).

Electric power generated by the generator 31 can be supplied to power grid by the power transmission line 37.

Operation

Figure 3:
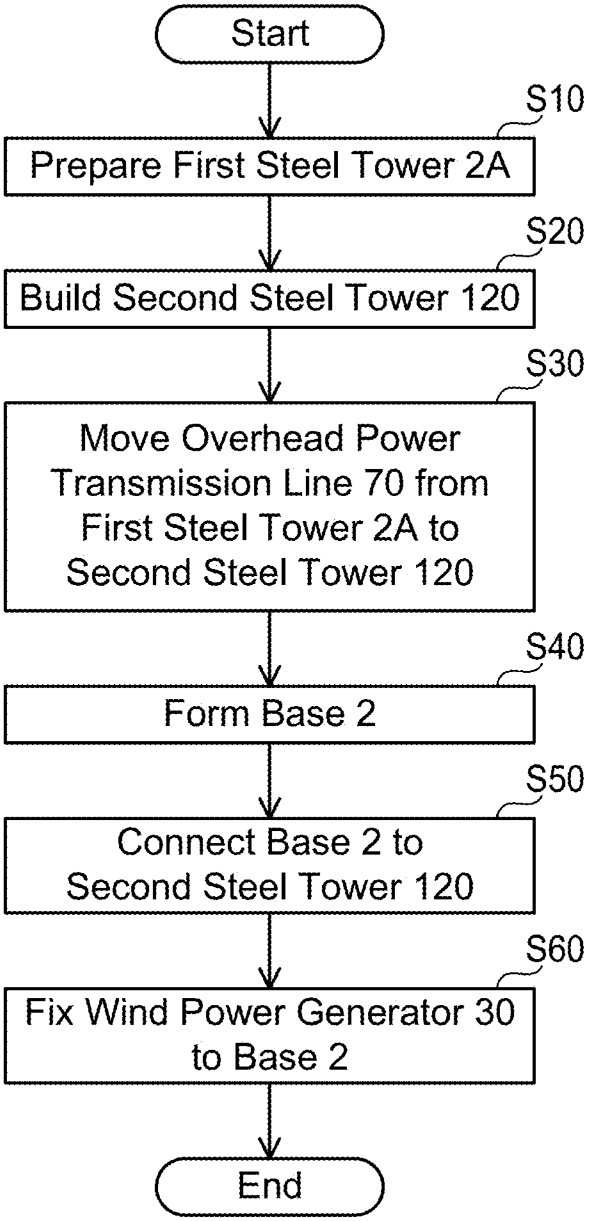
FIG. 3 illustrates a flowchart describing a method of installing a wind power generator 30.
Figure 4A:
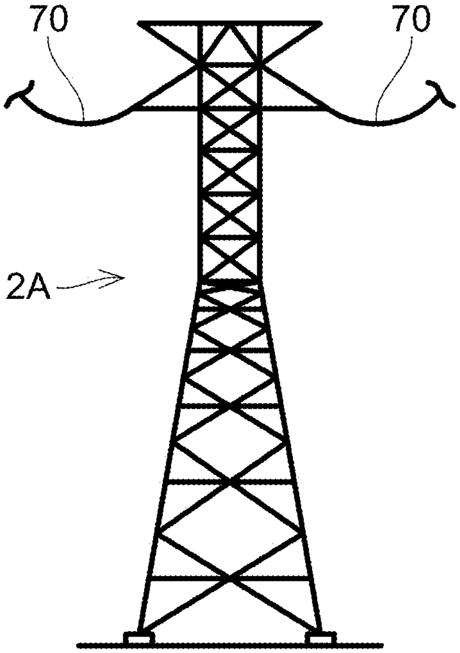
FIG. 4A illustrates a diagram for describing the method of installing the wind power generator 30.

A method of installing the wind power generator 30 will be described with reference to the flowchart of FIG. 3 and the explanatory diagram of FIGS. 4A to 4C. Hereinafter, "Step 10" will be abbreviated as "S10". In S10, the first steel tower 2A that needs to be replaced is prepared (see FIG. 4A). The first steel tower 2A supports an overhead power transmission line 70.

Figure 4B:
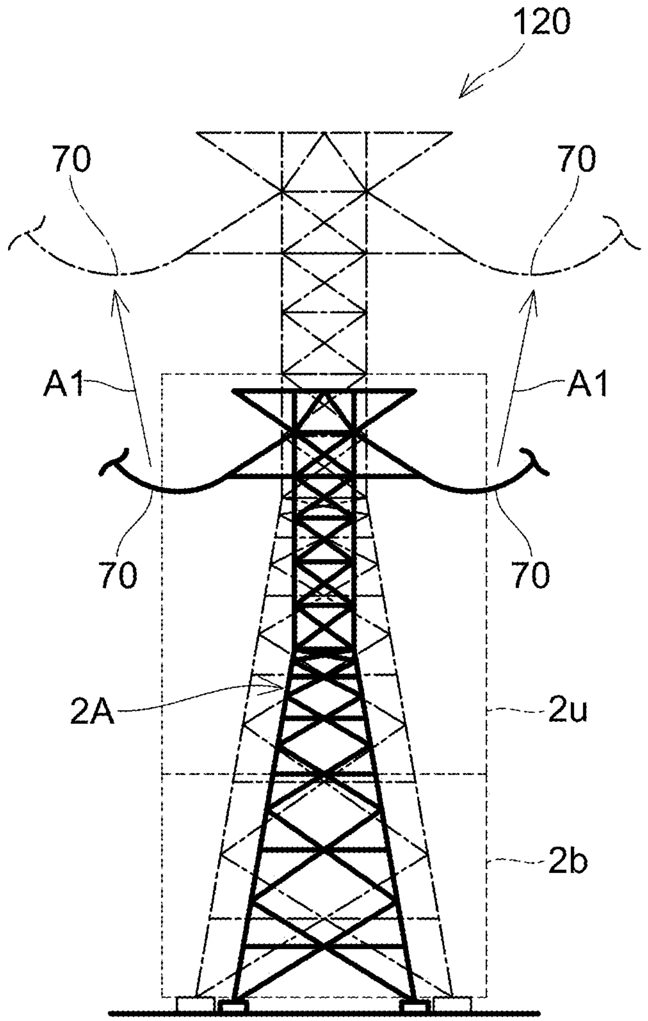
FIG. 4B illustrates a diagram for describing the method of installing the wind power generator 30.
Figure 4C:
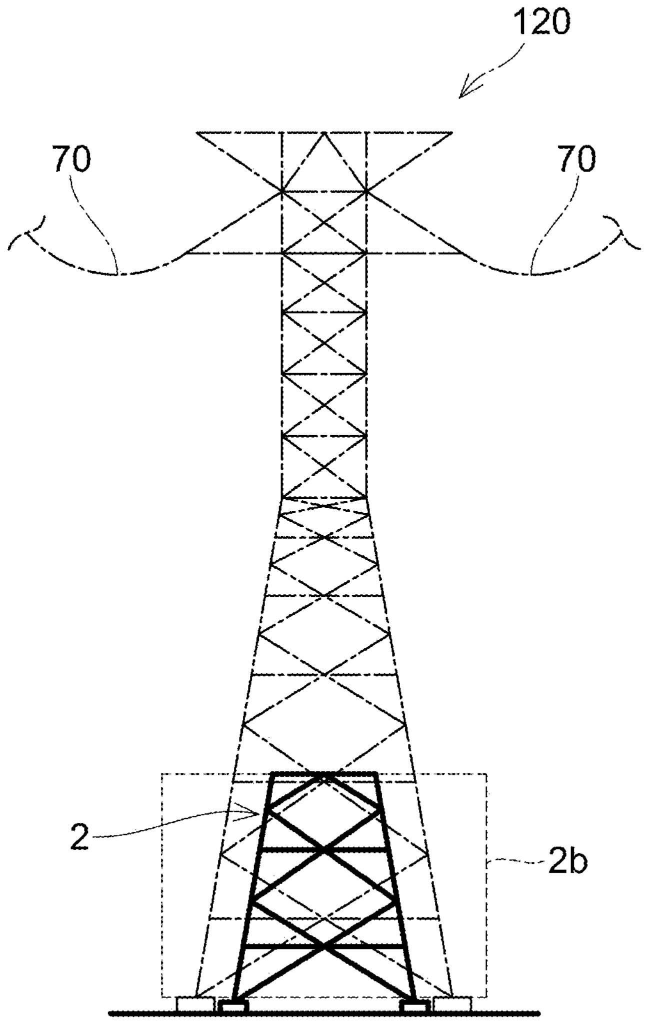
FIG. 4C illustrates a diagram for describing the method of installing the wind power generator 30.

In S20, the second steel tower 120 is constructed so as to wrap around (surround) the first steel tower 2A (see FIG. 4B). In FIGS. 4B and 4C, the second steel tower 120 is illustrated in imaginary lines. Such a construction method is also called a "wrapping method". Since the specific contents of the wrapping method are known, the description thereof will be omitted here.

In S30, the overhead power transmission line 70 is moved from the first steel tower 2A to the second steel tower 120 (see arrow A1).

In S40, an upper part 2*u* of the framework structure of the first steel tower 2A is removed (see FIG. 4B). Due to this, the base 2 is formed by a remaining lower part 2*b* (see FIG. 4C). The lower part 2*b* is a part fixed to the foundations.

In S50, the base 2 is connected to the second steel tower 120 using the connecting members 51-54 (see FIG. 1). In S60, the wind power generator 30 is fixed to the base 2. Specifically, the generator 31 is connected to each of the main column members 21-24 by the leg members 41-44 (see FIGS. 1 and 2). This completes the wind power generation system 1.

Effect

A base is required to install a wind power generator. However, in the case of newly building a base, time and man-hours had been required, for example, new concrete placing had been required. According to the technique of the present embodiment, the base 2 for fixing the wind power generator 30 can be formed by utilizing the first steel tower 2A that needs to be replaced. That is, the first steel tower 2A, which would have been removed in normal cases, can be reused as the base 2. Since it is not necessary to newly build the base 2, it is possible to reduce the time and man-hours for installing the wind power generator 30. It is possible to reduce the installation cost of the wind power generator 30.

In the technique of the present embodiment, the base 2 can be formed to include the lower part 2*b* of the first steel tower 2A. Due to this, the height of the installation surface IS in the base 2 can be made higher than that of the foundations. Since the wind power generator 30 can be installed at a high place where the wind speed is higher than the ground, power generation efficiency can be increased. In addition, the height of the base 2 can be made lower than that of the first steel tower 2A by removing the upper part 2*u* of the first steel tower 2A. Wind pressure the base 2 is to receive can be made smaller than the wind pressure the first steel tower 2A is to receive. It is possible to suppress load applied on the base 2.

According to the technique of the present embodiment, the base 2 can be formed inside the newly built second steel tower 120. Since the site of the second steel tower 120 can be effectively utilized, the wind power generator 30 can be newly built without securing a new site.

Second Embodiment

Configuration of Wind Power Generation System 201

Figure 5A:
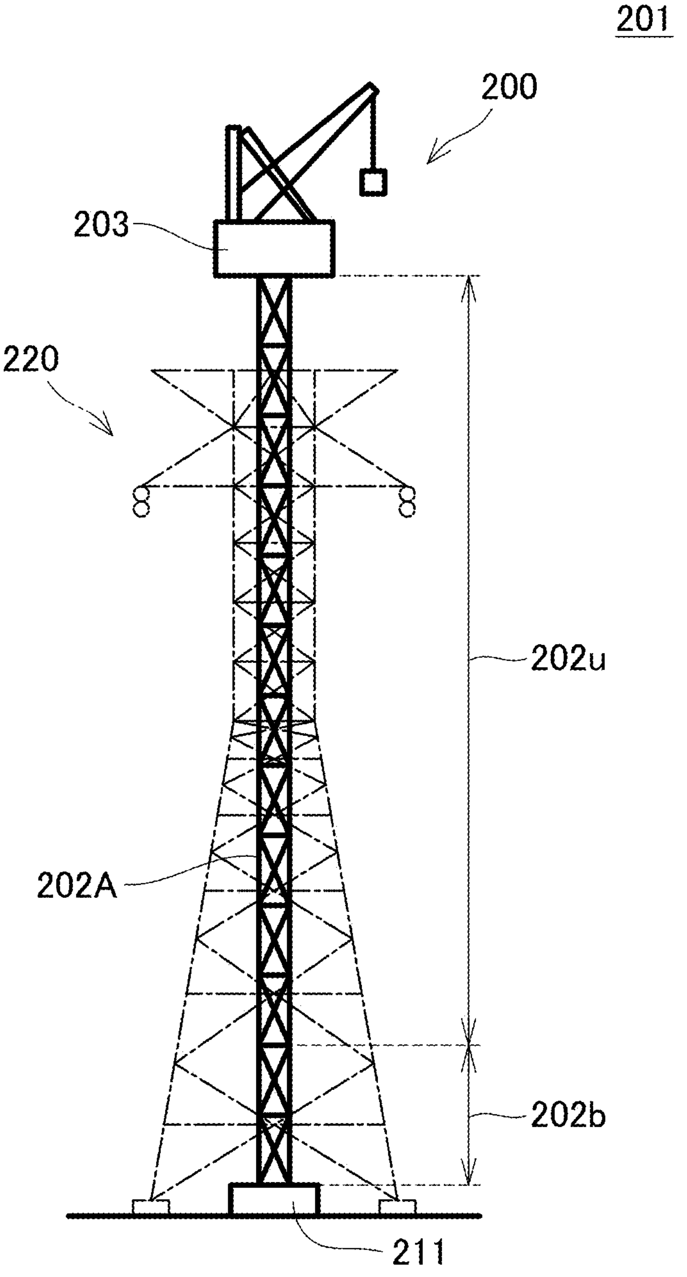
FIG. 5A illustrates a diagram for describing a method of installing a wind power generation system 201.
Figure 5B:
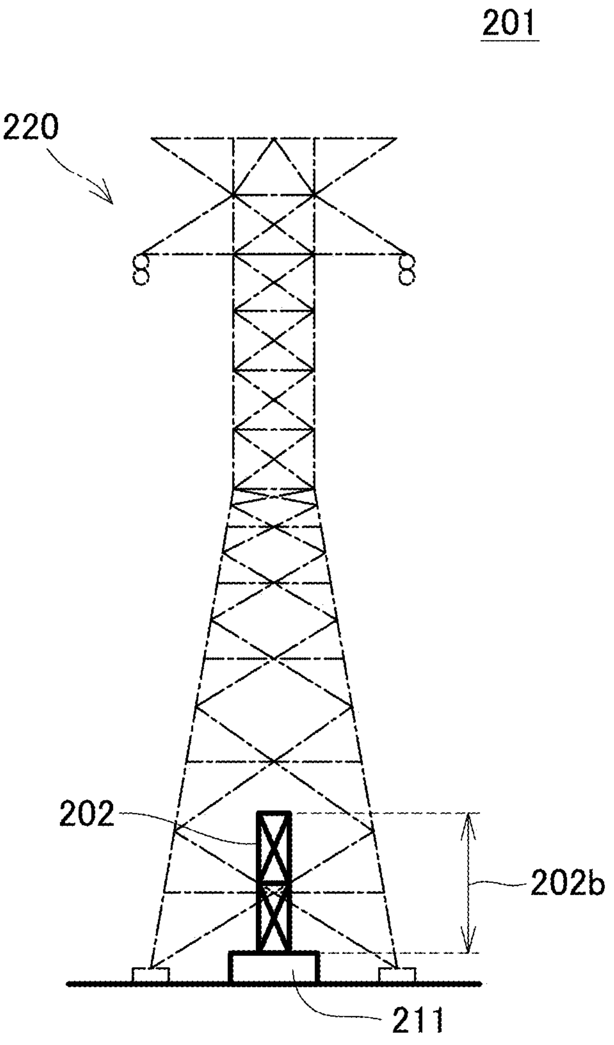
FIG. 5B illustrates a diagram for describing a method of installing a wind power generation system 201.
Figure 5C:
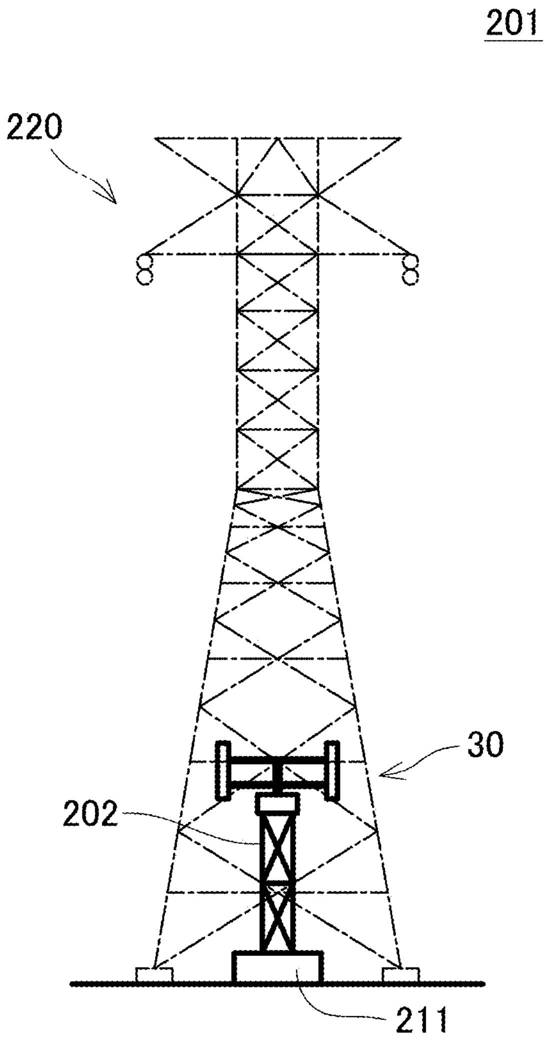
FIG. 5C illustrates a diagram for describing a method of installing a wind power generation system 201.

A method of installing a wind power generation system 201 according to the second embodiment will be described with reference to FIGS. 5A to 5C. FIGS. 5A to 5C is a side view similar to FIGS. 4A to 4C of the first embodiment. Configurations common between the second embodiment and the first embodiment will be denoted by the same reference numerals, and description thereof will be omitted. In addition, configurations specific to the second embodiment will be distinguished by indicating them with a reference numeral of 200 to 299.

FIG. 5A illustrates a completed third steel tower 220. The third steel tower 220 is a steel tower newly built by using a crane system 200. The third steel tower 220 can be constructed by known methods, such as a climbing crane method. The crane system 200 includes a foundation 211, a crane tower 202A, and a crane 203. The crane tower 202A has a framework structure. A base part of the crane tower 202A is fixed to the foundation 211. The crane 203 is fixed to an upper part of the crane tower 202A.

Next, as shown in FIG. 5B, the crane 203 is removed. In addition, an upper part 202*u* of the framework structure of the crane tower 202A is removed. Due to this, a base 202 is formed by a remaining lower part 202*b*. Finally, as shown in FIG. 5C, a wind power generator 30 is fixed to an upper part of the base 202. This completes the wind power generation system 201.

Effect

In the technique of the second embodiment, the crane tower 202A which was used for the construction of the third steel tower 220 can be utilized to form the base 202. Since it is not necessary to newly build the base 202, it is possible to reduce the time and man-hours for installing the wind power generator 30.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

Modifications

An arrangement of the wind power generator 30 in relation to the base 2 may be of various types. For example, the wind power generator 30 may be installed at a spot which is on the ground GND and also adjacent to the base 2. Due to this, a part of the four foundations 11-14 comprised by the base 2 can be diverted as the foundation(s) of the wind power generator 30. The installation cost of the wind power generator 30 can be reduced.

In the formation of the base 2, an entirety of the framework structure may be removed. In this case, the base 2 is composed only of the foundations.

The connecting members 51-54 that fix the base 2 to the main column members 21-24 may be omitted.

The structure of the wind turbine 33 may be of various types, and may be, for example, a horizontal axis type wind turbine.

The structure of the base 2 may be of various types. For example, it may have a shape of a substantially truncated triangular pyramid with three foundations.

What is claimed is:

1. A method for installing a wind power generator by utilizing an existing structure which comprises a foundation and a first steel tower fixed on the foundation, wherein the first steel tower has a steel framework structure and supports an overhead power line, the method comprising:

constructing a second steel tower such that the second steel tower wraps around the first steel tower;

moving the overhead power line from the first steel tower to the second steel tower after the constructing of the second steel tower;

removing, after the moving of the overhead power line, an upper part of the framework structure of the first steel tower such that a lower part of the first steel tower fixed to the foundation remains as a base;

connecting the lower part of the first steel tower to the second steel tower using a connecting member, wherein the connecting member extends from an upper end of the lower part of the first steel tower toward a main column member of the second steel tower; and fixing a wind power generator to the lower part of the first steel tower.

2. The method according to claim 1, wherein the constructing of the second steel tower is performed while the overhead power line remains supported by the first steel tower.

3. The method according to claim 1, wherein the lower part of the first steel tower comprises main column members extending upward from the foundation, and the wind power generator is fixed to upper ends of the main column members.

4. The method according to claim 1, wherein the wind power generator and the lower part of the first steel tower are located inside the second steel tower.

* * * * *